(12) United States Patent
Balabhadrapatruni et al.

(10) Patent No.: US 7,809,703 B2
(45) Date of Patent: Oct. 5, 2010

(54) USAGE OF DEVELOPMENT CONTEXT IN SEARCH OPERATIONS

(75) Inventors: Venkatuday M. Balabhadrapatruni, San Jose, CA (US); Steven K. Ma, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 11/615,726

(22) Filed: Dec. 22, 2006

(65) Prior Publication Data

US 2008/0154855 A1 Jun. 26, 2008

(51) Int. Cl.
*G06F 17/00* (2006.01)
(52) U.S. Cl. ..................................... 707/705
(58) Field of Classification Search .................. 707/705
See application file for complete search history.

(56) References Cited

U.S. PATENT DOCUMENTS

| | | | | |
|---|---|---|---|---|
| 5,675,802 | A * | 10/1997 | Allen et al. ................. | 717/103 |
| 6,223,343 | B1 * | 4/2001 | Hopwood et al. ........... | 717/101 |
| 6,430,556 | B1 * | 8/2002 | Goldberg et al. ............ | 707/4 |
| 6,487,713 | B1 * | 11/2002 | Cohen et al. ................ | 717/105 |
| 6,978,281 | B1 * | 12/2005 | Kruy et al. .................. | 707/203 |
| 7,076,496 | B1 * | 7/2006 | Ruizandrade ............... | 707/102 |
| 7,131,112 | B1 * | 10/2006 | Bartz et al. ................. | 717/122 |
| 2002/0040469 | A1 * | 4/2002 | Pramberger ................. | 717/121 |
| 2002/0046394 | A1 * | 4/2002 | Do et al. ..................... | 717/108 |
| 2002/0143757 | A1 | 10/2002 | Borovoy et al. | |
| 2003/0212663 | A1 | 11/2003 | Leno et al. | |
| 2003/0222906 | A1 * | 12/2003 | Fish et al. ................... | 345/744 |
| 2004/0153995 | A1 * | 8/2004 | Polonovski ................. | 717/113 |
| 2004/0181773 | A1 * | 9/2004 | Mortensen et al. .......... | 717/101 |
| 2005/0066306 | A1 * | 3/2005 | Diab ........................... | 717/108 |
| 2005/0097440 | A1 * | 5/2005 | Lusk et al. ............... | 715/500.1 |
| 2005/0102282 | A1 | 5/2005 | Linden | |
| 2005/0132343 | A1 * | 6/2005 | Bender ........................ | 717/145 |
| 2005/0138113 | A1 * | 6/2005 | Brendle et al. .............. | 709/203 |
| 2006/0015863 | A1 * | 1/2006 | Vaidyanathan et al. ...... | 717/170 |
| 2006/0178778 | A1 * | 8/2006 | Fuhlbrigge et al. .......... | 700/264 |
| 2007/0033567 | A1 * | 2/2007 | Carlson et al. .............. | 717/100 |
| 2007/0061702 | A1 * | 3/2007 | Letkeman .................... | 715/511 |
| 2007/0124373 | A1 * | 5/2007 | Chatterjee et al. ........... | 709/204 |
| 2007/0233681 | A1 * | 10/2007 | Ronen et al. .................... | 707/8 |
| 2007/0244906 | A1 * | 10/2007 | Colton et al. .................. | 707/10 |
| 2007/0299825 | A1 * | 12/2007 | Rush et al. ..................... | 707/3 |
| 2008/0235654 | A1 * | 9/2008 | Marius ........................ | 717/104 |

* cited by examiner

*Primary Examiner*—Charles Rones
*Assistant Examiner*—Kurt Mueller
(74) *Attorney, Agent, or Firm*—Rabindranath Dutta; Konrad Raynes & Victor LLP (57) ABSTRACT

Metadata corresponding to a plurality of documents is maintained. The metadata indicates whether a document includes information that is pertinent to a first development context and a second development context of a software development environment. A search term in a current development context of the software development environment is received. Search results comprising selected documents from the plurality of documents are generated. The selected documents are based on at least the search term, the current development context, and the metadata maintained with the plurality of documents.

15 Claims, 6 Drawing Sheets

USAGE OF DEVELOPMENT CONTEXT IN SEARCH OPERATIONS

BACKGROUND

1. Field

The disclosure relates to a method, system, and article of manufacture for the usage of development context in search operations.

2. Background

Software development platforms may be used for developing software, and such software development platforms may include a help system that allows users to enter search queries for seeking information stored in the help system. For example, Eclipse* is vendor-neutral open software development platform for building software. The Eclipse Help system on the Eclipse software development platform provides an Extensible Markup Language (XML) and Hypertext Markup Language (HTML) based framework for the integration of help contents. As an end user adds more and more tools to this software development platform, the volume of the help contents in the Eclipse Help system increases as each of the installed tools comes with its own set of documentation. This increase of information available to the user places a premium on an intelligent approach to help the user to filter irrelevant contents from useful information, and to deliver the useful information to the user in a friendly manner to promote efficient information retrieval. Further details of the Eclipse software development platform may be found in the URL "www.eclipse.org".

* Eclipse is a trademark of Eclipse Foundation, Inc.

Certain versions of software development platforms, such as Version 3.0x of the Eclipse Help system, provide a search function that allows users to submit a search query and retrieve document contents containing words that match the search query. This provides a shortcut for users to find the information for which the user is searching.

SUMMARY OF THE PREFERRED EMBODIMENTS

Provided are a method, system, and article of manufacture, wherein metadata corresponding to a plurality of documents is maintained, wherein the metadata indicates whether a document includes information that is pertinent to a first development context and a second development context of a software development environment. A search term in a current development context of the software environment development is received. Search results comprising selected documents from the plurality of documents are generated, wherein the selected documents are based on at least the search term, the current development context, and the metadata maintained with the plurality of documents.

In additional embodiments, the first development context is a perspective of the software development environment, wherein the second development context is a view of the software development environment.

In further embodiments, the current development context comprises a currently active perspective of the software development environment, and opened views corresponding to the currently active perspective.

In still further embodiments, generating the search results further comprises categorizing, ordering and ranking the selected documents based on relevance of the metadata to the current development context, wherein the categorized, ordered and ranked documents are presented as the search results to a sender of the search term.

In additional embodiments, those documents whose metadata indicates the current development context are more likely to be included in the selected documents of the search results in comparison to those documents whose metadata does not indicate the current development context.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Problems with Search in Certain Software Development Platforms

Users of the search function in certain software development platforms may face several problems. For example, in order to ensure that relevant information is returned on the search result, the burden may be on the user to enter a precise query. For novice users, this may not be an easy task.

Additionally, the lack of context awareness and understanding of user goals in certain software development platforms may lead to inaccurate search results. For example, certain software development platforms return documents with matching words in response to the search query. However, because words are often ambiguous when interpreted without their context (as a word can have multiple linguistic meanings), a large number of irrelevant document contents may be returned on the search result list even when the document does not contain information that matches the user's needs. For example, the term "mapping" assumes a different meaning from one tool to another and a search for "mapping" may return contents for a variety of topics from different tools, ranging from help contents on mapping enterprise beans to database tables for Java* programmers, to help contents on modifying z/OS* file name mapping that are useful primarily to mainframe programmers developing z/OS applications. The context-less and indiscriminate search result may further complicate the user task and increase the frustration of the user. Globalization (i.e. translation) of the help contents may exacerbate this problem because the quality of information may suffer a loss in the process of being translated from one language to another due to errors in communication between information developers and translators, or cultural differences in word usage, or both.

* Java and all Java-based trademarks are trademarks of Sun Microsystems, Inc. in the United States, other countries, or both.

In addition, a large volume of information content may further exacerbate the problem of finding the desired information as more and more additional content items are found and displayed on the search result, placing an extra burden on the user to perform a "search within search" by visually locating the desired information from the search results. While certain software development systems do return the search results with a rank score, the rank score may depend on how a document was written, and not necessarily on the relevance of the document to a user's interest.

The increased content volume in the search result may lead to a direct degradation in the efficiency of information retrieval. It may also lead to an increase in the likelihood of a user making the wrong choice (i.e. selecting a document that contains irrelevant information), thus potentially wasting a user's time and increasing the user's frustration in the case where multiple attempts were needed before the desired information was found.

Solutions in Certain Software Development Platforms

Context sensitive help is available in certain software development platforms. For example, a user can click on an object, press the F1 key, and object specific information can be displayed. Often time, this is appropriate to learn about the selected object, but information depth and breadth is often lacking since multiple actions can be applied to the object. For instance, one may perform a context sensitive help action against a COBOL copybook member to learn how to perform syntax check against it, but if someone is interested in knowing how to enable such a member for Web service, it is unlikely context sensitive help will provide such answer.

Some intelligence may be introduced into understanding the linguistic meaning of the search query. Currently, some search mechanisms perform a word for word matching to retrieve what is deemed to be relevant information to the user search query. Another logical step could be to interpret the meaning of the user search query, parse the available documentation and return documents that contain matching strings to the user query, but also select contents that semantically match the user's search. While this is a plausible solution, its implementation could be very costly from the search engine's point of view as the search engine now needs to perform calculation based on some algorithms to understand what the user tries to search, what contents are available, and what these contents mean semantically. The end user may also suffer from a longer wait time as the aforementioned could consume significant computation power. Finally, the quality of the information returned may not always be accurate, since the interpretation of a user's search intent based on textual inputs could be vague in many cases.

In certain software development systems, the provided search scope in the help system may be used to narrow down search scope and results. For example, certain help systems may provide an option for users to limit the search scope. This is a useful feature for users who already have some familiarity with the structure of the documentation, and know where the particular help information that the user is searching for resides. However, in many cases, the user may not know where the particular help information that the user is searching for resides. In addition, such an approach could be error prone because a user could specify the wrong scope and unintentionally leave out documentation that should be included for a given search.

Dynamic help features in certain software development platforms may provide a context sensitive approach for presenting users with a set of related help contents in a view for the user's current perspective. For example, if the user is on the Debug perspective, help contents for debug may be displayed when Dynamic Help is invoked. Similarly, if a user is in the Java perspective, help contents for Java development may be displayed when Dynamic Help is invoked. While the set of contents changes with the perspective change, each set of contents displayed for each perspective is predetermined by the tool provider, and therefore, the content is static in nature. In addition, the set of predetermined contents does not necessarily address the question the user has in mind since it does not provide the user the option to intervene in the process of content generation.

Exemplary Embodiments

Certain embodiments enhance search mechanisms by appending additional search parameters, such as the name of the currently active perspective and opened views, to the search query. These additional search parameters may be used to rank the relevance of the search results, and to categorize and order the search results.

In certain embodiments, perspectives and views are used to achieve context filtering in response to search queries. Certain embodiments enhance the quality of search results by taking advantage of the development context in certain development systems (e.g., Eclipse), known as perspectives and views. Certain embodiments capture the information about the current perspective that the user is on, as well as the views that are opened in this perspective. This information may then be used in a user's search to help weigh, prioritize, and group the presentation of the search results. The underlying assumption is that there is a direct correlation between a user's search term(s) and the working context that the user is in. For example, an IBM* WebSphere* Developer for zSeries* (WDz) user who performs a search for "compiler option" while on the z/OS Projects perspective is more likely to be interested in finding information on COBOL or PL/I compiler options than in finding information on Java compiler options. This is because the user is working in the context of the z/OS development environment.

* IBM, WebSphere, zSeries, and z/OS are registered trademarks of International Business Machines Corporation in the United States, other countries, or both.

Figure 1:
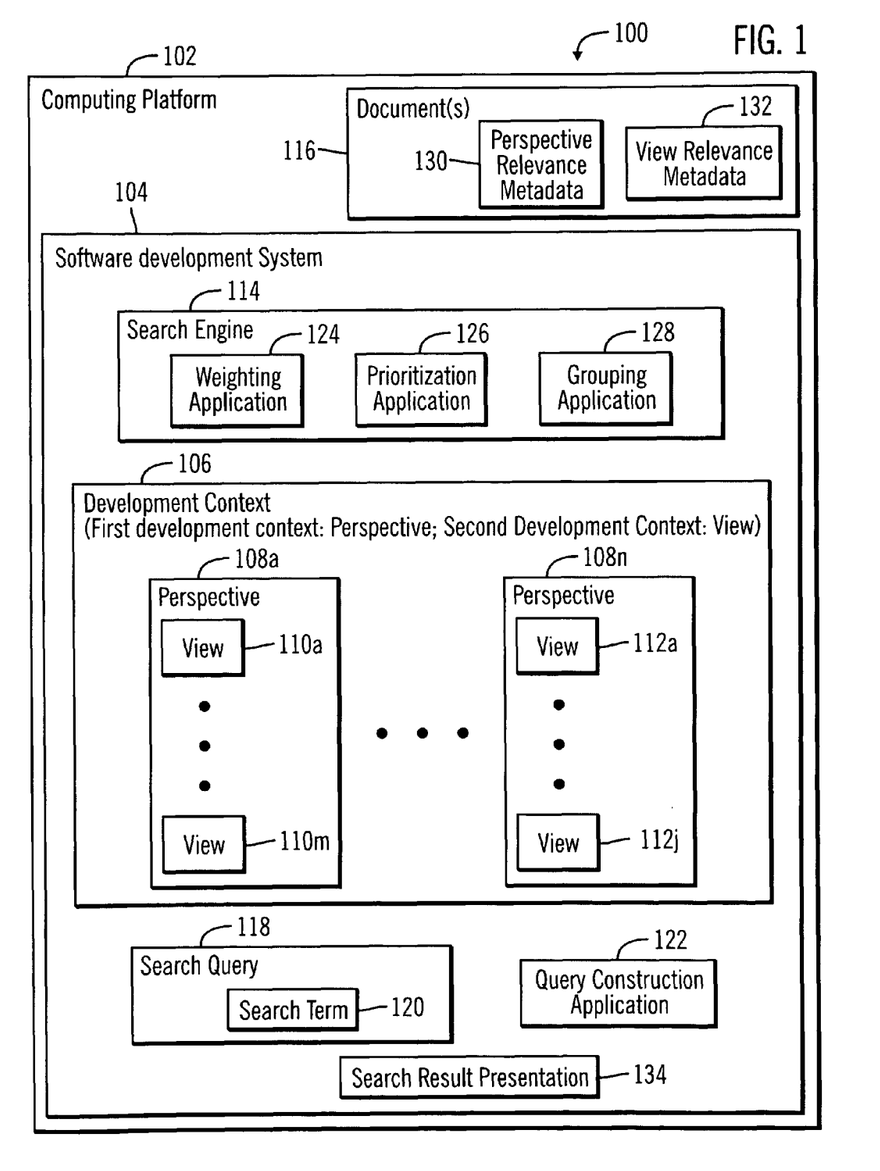
FIG. 1 illustrates a block diagram of a computing environment, in accordance with certain embodiments.

FIG. 1 illustrates a block diagram of a computing environment 100, in accordance with certain embodiments. The computing environment 100 includes a computing platform 102, wherein the computing platform 102 may comprise any suitable computing device, including those presently known in the art, such as, a personal computer, a workstation, a mainframe, a midrange computer, a network appliance, a palm top computer, a telephony device, a blade computer, a hand held computer, etc.

The computing platform 102 may include a software development system 104. For example, in certain embodiments the software development system 104 may comprise Eclipse. However, other software development systems besides Eclipse may be used in other embodiments.

The software development system 104 can operate in one or more development contexts 106, wherein in certain embodiments, such as Eclipse, the development contexts 106 may comprise a plurality of perspectives 108, wherein each perspective may comprise a plurality of views. For example, a first perspective may comprise a plurality of views 110, and a second perspective may comprise a plurality of views 112. While FIG. 1 shows perspectives and views, in alternative embodiments, the developments contexts 106 may comprise any other development context, such as a first development context and a second development context. For example, in Eclipse, the first development context could correspond to the perspective and the second development context could correspond to the view.

The software development system 104 includes a search engine 114 that can be used to search documents that are included in a plurality of documents 116. While the plurality of documents 116 has been shown outside the software development system 104, in alternative embodiments the plurality of documents may be located within the software development system 104. In still other embodiments, the plurality of documents 116 may be located outside the computing platform 102.

The software development system 104 includes functions for receiving a search query 118 that includes at least one search term 120, where the search term 120 may be generated by a user or a computer program. A query construction application 122 associated with the software development system 104 may augment the search query 118 such that current perspective and currently opened views of the software development system 104 may be included with the search term 120 when the search query 118 is presented to the search engine 114. In certain alternative embodiments, the functions of the query construction application 122 may be included in the search engine 114.

The search engine 114 may include a weighting application 124 for weighting various documents selected by the search engine 114 in response to a search query 118, a prioritization application 126 for prioritizing various documents selected by the search engine 114 in response to a search query 118, and a grouping application 128 for grouping, i.e., categorizing, various documents selected by the search engine 114 in response to a search query 118.

In certain embodiments, each of the plurality of documents 116 may have included in them metadata, such as perspective relevance metadata 130 and view relevance metadata 132. For example, the perspective relevance metadata 130 corresponding to a document may indicate the one or more perspectives for which the document is pertinent, and the view relevance metadata 132 may indicate the one or more views for which the document is pertinent. In alterative embodiments, the perspective relevance metadata 130 and the view relevance metadata 132 may indicate pertinence of the document for a first development context and a second development context respectively.

A view serves a particular purpose in a software development system, and a set of coherent views are organized into a perspective, which serves a particular mission. For instance, in the Eclipse based product IBM WebSphere Developer for zSeries, the z/OS Projects perspective is composed of views such as the Remote System Explorer, the Editor, the Remote Commands view, the z/OS File System Mapping view, the Problems view, the Properties view, and the Outline view. Each of these views lets a user perform certain tasks. Collectively, these views make up a particular perspective, wherein a perspective supports application developers to develop and build applications.

The search engine 114 generates a search result presentation 134 in response to the search query 118, wherein the search result presentation 134 includes selected documents from the plurality of documents 116. The selected documents may be generated based on the search term 120, the current development context, and relevance metadata 130, 132 included in the plurality of documents 116.

Figure 2:
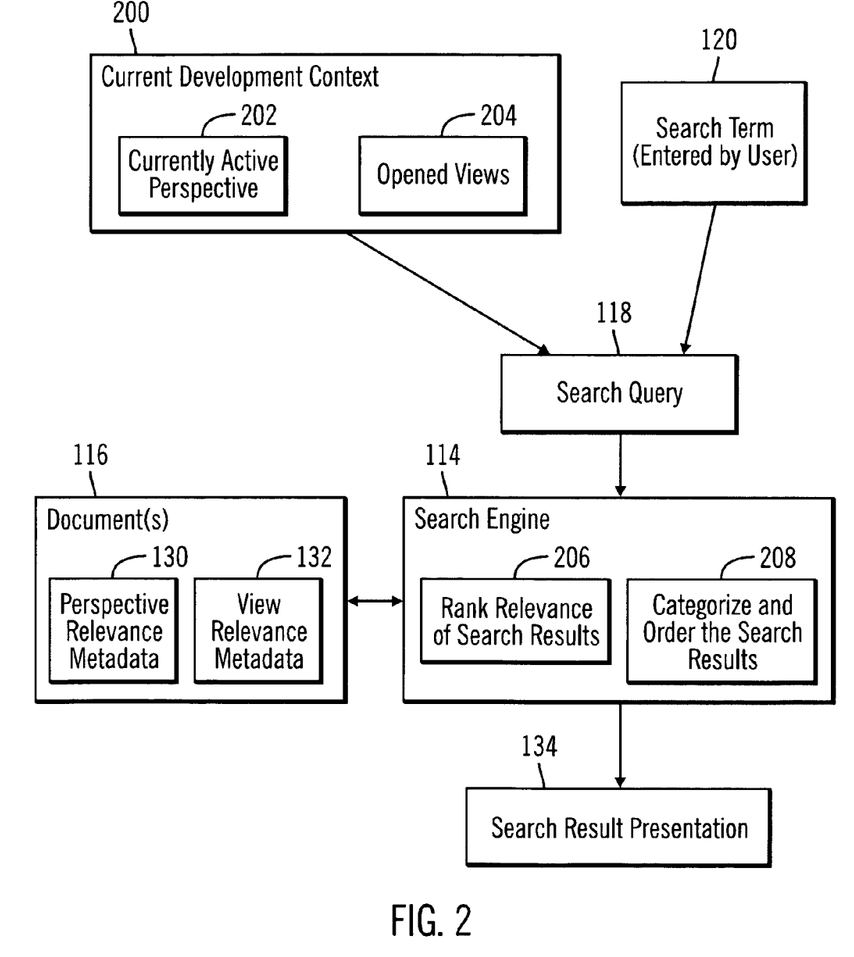
FIG. 2 illustrates a block diagram that shows the generation of search results based on a search query, document metadata, and the current development context, in accordance with certain embodiments.

FIG. 2 illustrates a block diagram that shows the generation of search results based on a search query 118, document metadata 130, 132, and the current development context 200, in accordance with certain embodiments.

A current development context 200 in the software development system 104 may be comprised of a currently active perspective 202 and opened views 204. A search term 120 may be entered by a user. The search query 118 may be generated from the search term 120, the currently active perspective 202 and the opened views 204, and the search query 118 may be received by the search engine 114.

The search engine 114 searches the plurality of documents 116, where the plurality of documents 116 includes perspective relevance metadata 130 and view relevance metadata 132. The search engine 114 determines documents from the plurality of documents 116 based on whether the documents are relevant to the search term 120, the currently active perspective 202, and the opened views 204. The determined documents may be referred to as the search results. The search engine 114 can determine the rank relevance of the search results (reference numeral 206) and can categorize and order the search results (reference numeral 208) and generate the search result presentation 134 for the user.

Figure 3:
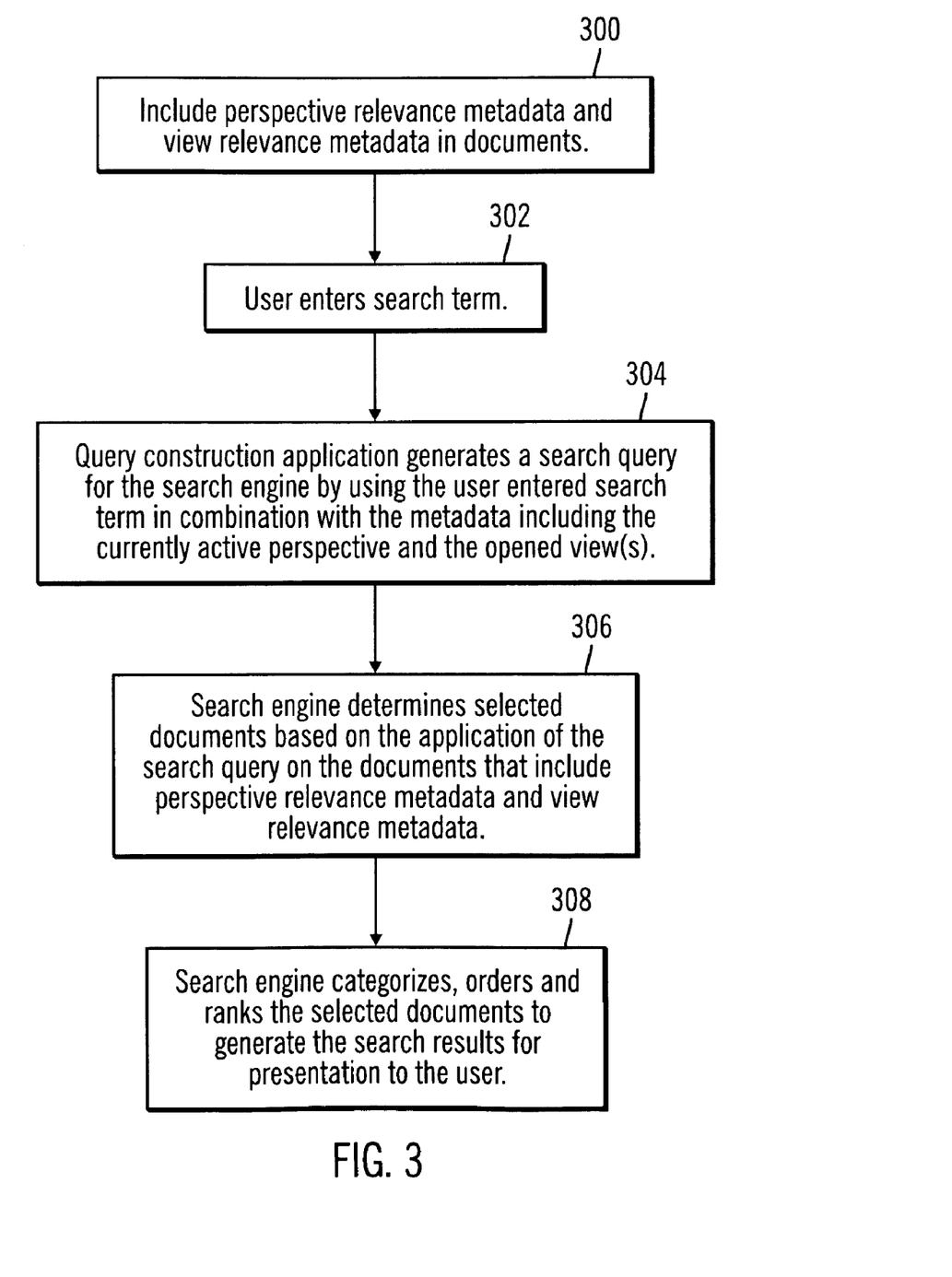
FIG. 3 illustrates first operations for the usage of development context in search operations, in accordance with certain embodiments.

FIG. 3 illustrates first operations for the usage of development context in search operations, in accordance with certain embodiments. The operations illustrated in FIG. 3 may be implemented in the computational platform 102 of the computing environment 100.

Control starts at block 300, where the perspective relevance metadata 130 and the view relevance metadata 132 are included in documents. In certain embodiments, information developers at development time annotate the plurality of documents 116 with a metadata tag that identifies the one or more perspectives to which each page of the information content belongs. Similarly, information developers at development time may annotate the plurality of documents 116 with a metadata tag that identifies the one or more views to which each page of the information content belongs. Documents that are not categorized to any perspective may still be searched and retrieved, but they may show up in the search results under a different category that may in certain embodiments be labeled as "others".

Control proceeds to block 302, where the user enters the search term 120. The query construction application 122 generates (at block 304) a search query 118 for the search engine 114 by using the user entered search term 120 in combination with the metadata including the currently active perspective 202 and the opened views 204.

The search engine 114 determines (at block 306) selected documents based on the application of the search query 118 on the documents 116 that include perspective relevance metadata 130 and view relevance metadata 132. The search engine 114 categorizes, orders and ranks the selected documents to generate the search results for presentation to the user.

Figure 4:
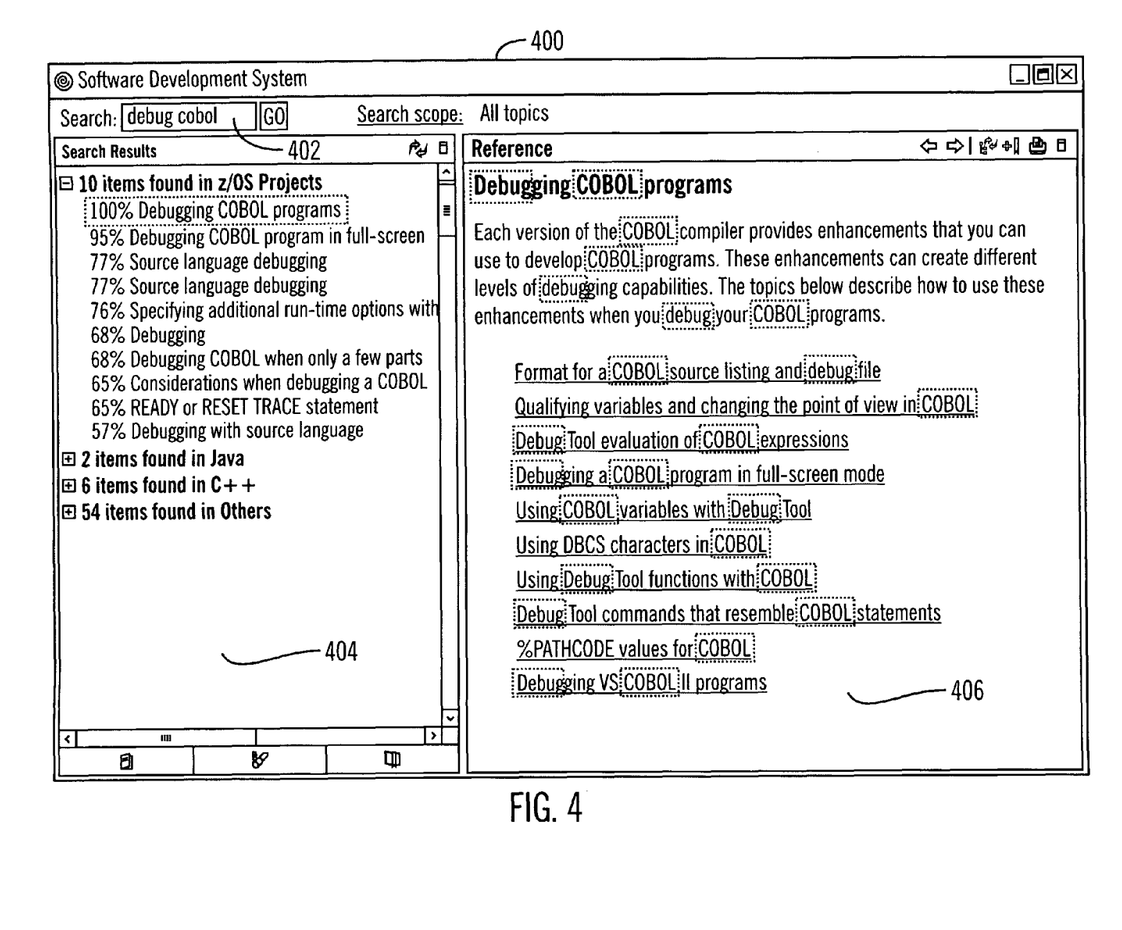
FIG. 4 illustrates a graphical user interface of a software development system, in accordance with certain embodiments.

FIG. 4 illustrates an exemplary graphical user interface 400 of a software development system, in accordance with certain embodiments. The graphical user interface 400 may be implemented in certain embodiments by the software development system 104 of the computational platform 102.

FIG. 4 illustrates certain embodiments in which a COBOL application developer is currently using the z/OS Projects perspective on WDz, and is editing a COBOL program with the z/OS Live Parsing Extensible (LPEX) editor. He has just finished editing the file, and would like to debug the flow of the program. Being new to WDz, the COBOL application developer enters the search term "debug cobol" (reference numeral 402). The tool passes the search query "debug cobol", along with the name of the current perspective "z/OS Projects" and the name of the set of opened views to the search engine 114 as the search parameters. The and exemplary search query could be as follows:

Search for
<content IS "debug" AND "cobol"
WHERE Perspective IS "z/OS Projects" AND
WHERE View IS "Remote System Explorer" OR "z/OS LPEX editor" OR "Remote Commands" OR "z/OS File System Mapping" OR "Problems" OR "Properties" OR "Outline"
WHERE currentFocus IS "z/OS LPEX editor">

In response to the search query 118, document pages that include the term "debug" and "cobol" are found. The document pages may then be ranked based on the name of the perspective and views passed in the search query 118. Documents that contain the search query "debug cobol" and have matching metadata tags to the user's current perspective and opened views may receive a higher rank score than an identical document that is categorized to belong to another perspective, or another view, or neither.

For example, a document containing "debug cobol", classified to have "perspective=z/OS Projects" and "views=Remote Commands, z/OS LPEX editor" may have a higher rank than another document containing "debug cobol", but classified to have "perspective=Java" and "views=LPEX editor".

The search results are then presented to the user in an organized manner that's reflective of the perspective that the document is found. The window panes 404 and 406 illustrate an exemplary presentation of the search results. Results are ranked and prioritized based on the user search query, and the context from which the search query was executed.

The name of the perspective and the name of the opened views could be passed along as metadata in each search query. The search could take into account this information about the current perspective and the currently opened views in the ranking of the search result relevance (the weight of the perspective factor could vary). Once all the results are ranked, the results may then be organized by the perspectives in which they were found. By default, the results found in the current user perspective may be expanded and shown as illustrated in FIG. 4, while results found for other perspectives may be shown under their respective category or categories, but collapsed. In the case where multiple documents with the same perspective and view tags are found, documents that are classified to be relevant to the view that is currently in focus may be the one that wins the "tie-breaker" and carries a higher rank score.

Figure 5:
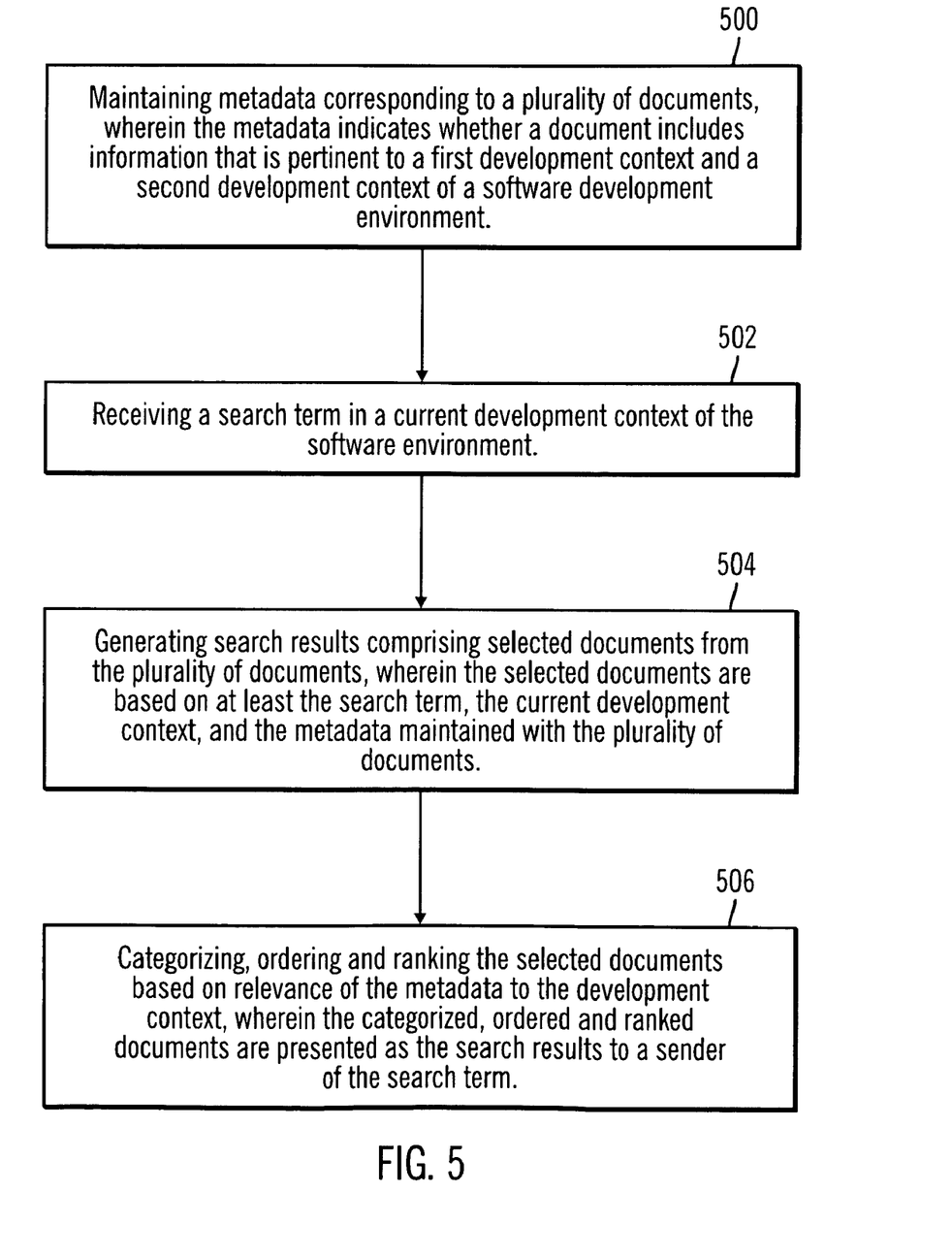
FIG. 5 illustrates second operations for the usage of development context in search operations, in accordance with certain embodiments.

FIG. 5 illustrates second operations for the usage of development context in search operations, in accordance with certain embodiments. The operations illustrated in FIG. 5 may be implemented in the computational platform 102 of the computing environment 100.

Control starts at block 500, where metadata 130, 132 corresponding to a plurality of documents 116 are maintained, wherein the metadata indicates whether a document includes information that is pertinent to a first development context, such as a perspective and a second development context, such as a view, of a software development environment, and wherein the software development environment may in certain embodiments be the software development system 104.

A search term 120 is received (at block 502) in a current development context of the software development environment. Search results comprising selected documents from the plurality of documents are generated (at block 504), wherein the selected documents are based on at least the search term 120, the current development context 200, and the metadata 130, 132 maintained with the plurality of documents 116.

The selected documents are categorized, ordered, and ranked (at block 506) based on relevance of the metadata to the current development context 200, wherein the categorized, ordered and ranked documents are presented as the search results to a sender of the search term.

Certain embodiments apply user work context in the search query to improve the relevance of the search results. These results provide at least the following:

1) A more precise calculation of the ranking of the search results that is dynamically generated based on the user's work context;
2) A more efficient task time as the user needs to spend less time separating the relevant information from the irrelevant information; and
3) A reduction in errors, because the results are ranked and categorized by user context, and as a result the chance of a user selecting an irrelevant document is reduced.

These may lead to an increase in the usability of search, and higher user satisfaction.

In certain embodiments, the process of obtaining search results is interactive, i.e., it allows the user to specify the information that is of interest to the user through the search field. Certain embodiments do not require the user to determine in advance what the search context ought to be.

Ambiguity in search can be significantly reduced by adopting a context sensitive approach. Words, especially when used in isolation and out of context, can be ambiguous in meaning. For example, the word "link" for Web application developers could mean hyperlink, while the same word refers to a step in the build process for a COBOL developer (the linking of object decks). By taking the user development context into account during search, this ambiguity is reduced, and the user may obtain a better quality list of search results (higher relevance) in comparison to situations where the user development context was not taken into account during search.

Similarly, to further reduce ambiguity of a user's search intent, in certain embodiments the search can take into account the views that are currently opened inside a perspective to interpret the user search context. Because Eclipse is an open platform, users may use views from other perspectives in conjunction with an existing perspective to achieve a certain goal. In doing so, the user work context is altered, and this change needs to be accounted for in the search context to more closely reflect the user's intent. For example, the Data perspective provided in a first software development system supports user goals in creating, reading, updating and deleting Java stored procedures. A second software development system may extend this capability to support COBOL stored procedures. In doing so, a user is most likely to have COBOL source files opened in the editor view, and a Remote System Explorer view opened in the Data perspective so that the user can navigate through the source file. In this example, if the user is to perform a search for "build stored procedure", the user is likely to be looking for help on building a COBOL stored procedure, and not for building a Java stored procedure. So while the user is in the Data perspective, accounting for the views opened may provide additional information to resolve potential ambiguity within a perspective.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
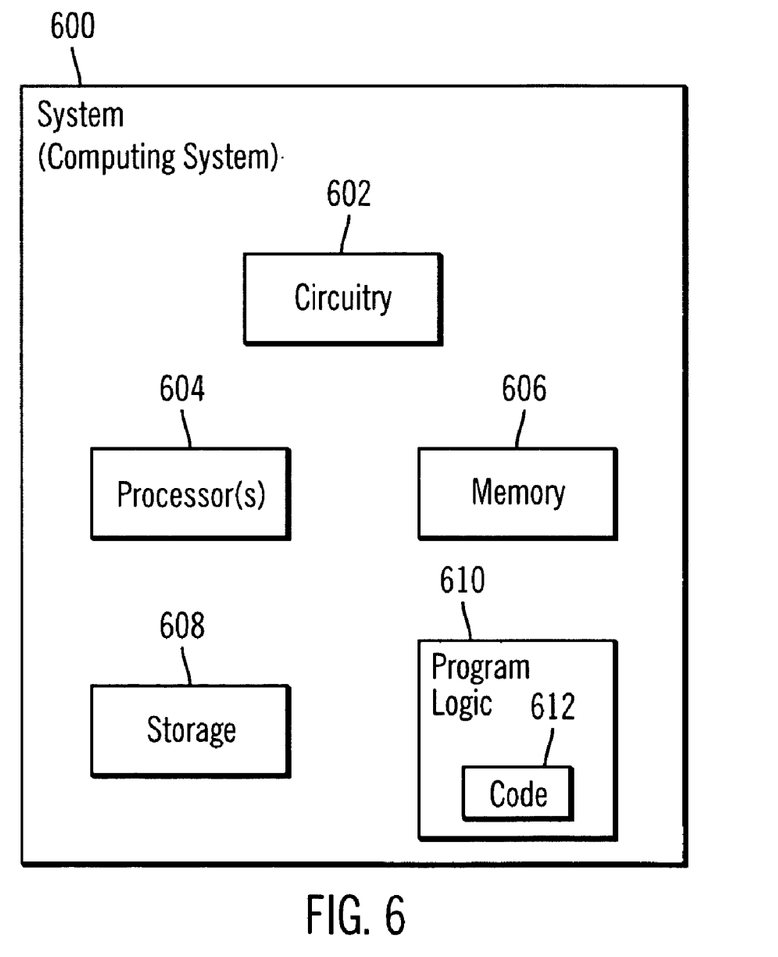
FIG. 6 illustrates a block diagram of a computer architecture in which certain described embodiments are implemented.

FIG. 6 illustrates the architecture of computing system 600, wherein in certain embodiments the computing platform 102 of the computing environment 100 of FIG. 1 may be implemented in accordance with the architecture of the computing system 600. The computing system 600 may also be referred to as a system, and may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instructions by a person or automated processing integrating computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    maintaining, by a computer, metadata corresponding to a plurality of documents of a help system of a software development environment, wherein the metadata indicates whether a document includes information that is pertinent to a perspective and a view of the software development environment, wherein:
        a plurality of perspectives are maintained;
        a plurality views are contained within each perspective of the plurality of perspectives; and
        the plurality of views contained within a particular perspective of the plurality of perspectives are accessible via selection of the particular perspective;
    receiving, by the computer, a search term from a user in a current development context of the software development environment, wherein the user prefers information to be returned based on the search term in the current development context over information based on the search term in other development contexts;
    augmenting, by a query construction application, a search query with the received search term, the current perspective, and currently opened views of the current perspective in the current development context, in response to receiving the search term from the user;
    sending the augmented search query to a search engine executing within the computer, in response to the augmenting of the search query by the query construction application; and
    generating, by the search engine executing within the computer, search results comprising selected documents from the plurality of documents, wherein the selected documents of the help system of the software development environment are based on at least the augmented search query and the metadata maintained with the plurality of documents.

2. The method of claim 1, wherein generating the search results further comprises:
    categorizing, ordering and ranking, by the computer, the selected documents based on relevance of the metadata to the current development context, wherein the categorized, ordered and ranked documents are presented as the search results to the user.

3. The method of claim 1, wherein those documents whose metadata indicates the current development context are more likely to be included in the selected documents of the search results in comparison to those documents whose metadata does not indicate the current development context.

4. A system, comprising:
    memory; and
    a processor coupled to the memory, wherein the processor performs operations, the operations comprising:
        maintaining metadata corresponding to a plurality of documents of a help system of a software development environment, wherein the metadata indicates whether a document includes information that is pertinent to a perspective and a view of the software development environment, wherein:
            a plurality of perspectives are maintained;
            a plurality views are contained within each perspective of the plurality of perspectives; and
            the plurality of views contained within a particular perspective of the plurality of perspectives are accessible via selection of the particular perspective;
        receiving a search term from a user in a current development context of the software development environment, wherein the user prefers information to be returned based on the search term in the current development context over information based on the search term in other development contexts;
        augmenting, by a query construction application, a search query with the received search term, the current perspective, and currently opened views of the current perspective in the current development context, in response to receiving the search term from the user;
        sending the augmented search query to a search engine, in response to the augmenting of the search query by the query construction application; and
        generating, by the search engine, search results comprising selected documents from the plurality of documents, wherein the selected documents of the help system of the software development environment are based on at least the augmented search query and the metadata maintained with the plurality of documents.

5. The system of claim 4, wherein generating the search results further comprises:
    categorizing, ordering and ranking the selected documents based on relevance of the metadata to the current development context, wherein the categorized, ordered and ranked documents are presented as the search results to the user.

6. The system of claim 4, wherein those documents whose metadata indicates the current development context are more likely to be included in the selected documents of the search results in comparison to those documents whose metadata does not indicate the current development context.

7. A computer readable storage medium, wherein code stored in the computer readable storage medium when executed by a computer causes operations, the operations comprising:
    maintaining, by the computer, metadata corresponding to a plurality of documents of a help system of a software development environment, wherein the metadata indicates whether a document includes information that is pertinent to a perspective and a view of the software development environment, wherein:
a plurality of perspectives are maintained;
a plurality views are contained within each perspective of the plurality of perspectives; and
the plurality of views contained within a particular perspective of the plurality of perspectives are accessible via selection of the particular perspective;
receiving, by the computer, a search term from a user in a current development context of the software development environment, wherein the user prefers information to be returned based on the search term in the current development context over information based on the search term in other development contexts;
augmenting, by a query construction application, a search query with the received search term, the current perspective, and currently opened views of the current perspective in the current development context, in response to receiving the search term from the user;
sending the augmented search query to a search engine executing within the computer, in response to the augmenting of the search query by the query construction application; and
generating, by the search engine executing within the computer, search results comprising selected documents from the plurality of documents, wherein the selected documents of the help system of the software development environment are based on at least the augmented search query and the metadata maintained with the plurality of documents.

8. The computer readable storage medium of claim 7, wherein generating the search results further comprises:
categorizing, ordering and ranking the selected documents based on relevance of the metadata to the current development context, wherein the categorized, ordered and ranked documents are presented as the search results to the user.

9. The computer readable storage medium of claim 7, wherein those documents whose metadata indicates the current development context are more likely to be included in the selected documents of the search results in comparison to those documents whose metadata does not indicate the current development context.

10. A method for deploying computing infrastructure, comprising integrating computer-readable code into a computer, wherein the code in combination with the computer performs operations, the operations comprising:
maintaining, by the computer, metadata corresponding to a plurality of documents of a help system of a software development environment, wherein the metadata indicates whether a document includes information that is pertinent to a perspective and a view of the software development environment, wherein:
a plurality of perspectives are maintained;
a plurality views are contained within each perspective of the plurality of perspectives; and
the plurality of views contained within a particular perspective of the plurality of perspectives are accessible via selection of the particular perspective;
receiving, by the computer, a search term from a user in a current development context of the software development environment, wherein the user prefers information to be returned based on the search term in the current development context over information based on the search term in other development contexts;
augmenting, by a query construction application, a search query with the received search term, the current perspective, and currently opened views of the current perspective in the current development context, in response to receiving the search term from the user;
sending the augmented search query to a search engine executing within the computer, in response to the augmenting of the search query by the query construction application; and
generating, by the search engine executing within the computer, search results comprising selected documents from the plurality of documents, wherein the selected documents of the help system of the software development environment are based on at least the augmented search query and the metadata maintained with the plurality of documents.

11. The method for deploying computing infrastructure of claim 10, wherein generating the search results further comprises:
categorizing, ordering and ranking the selected documents based on relevance of the metadata to the current development context, wherein the categorized, ordered and ranked documents are presented as the search results to the user.

12. The method for deploying computing infrastructure of claim 10, wherein those documents whose metadata indicates the current development context are more likely to be included in the selected documents of the search results in comparison to those documents whose metadata does not indicate the current development context.

13. A system, comprising:
a processor implemented in hardware;
a computer having the processor; and
means for maintaining, by the computer, metadata corresponding to a plurality of documents of a help system of a software development environment, wherein the metadata indicates whether a document includes information that is pertinent to a perspective and a view of the software development environment, wherein:
a plurality of perspectives are maintained;
a plurality views are contained within each perspective of the plurality of perspectives; and
the plurality of views contained within a particular perspective of the plurality of perspectives are accessible via selection of the particular perspective;
means for receiving, by the computer, a search term from a user in a current development context of the software development environment, wherein the user prefers information to be returned based on the search term in the current development context over information based on the search term in other development contexts;
means for augmenting, by a query construction application, a search query with the received search term, the current perspective, and currently opened views of the current perspective in the current development context, in response to receiving the search term from the user;
means for sending the augmented search query to a search engine executing within the computer, in response to the augmenting of the search query by the query construction application; and
means for generating, by the search engine executing within the computer, search results comprising selected documents from the plurality of documents, wherein the selected documents of the help system of the software development environment are based on at least the augmented search query and the metadata maintained with the plurality of documents.

14. The system of claim 13, wherein the means for generating the search results further performs:

ca­tegorizing, ordering and ranking the selected documents based on relevance of the metadata to the current development context, wherein the categorized, ordered and ranked documents are presented as the search results to the user.

15. The system of claim 13, wherein those documents whose metadata indicates the current development context are more likely to be included in the selected documents of the search results in comparison to those documents whose metadata does not indicate the current development context.

* * * * *